(12) United States Patent
Huber et al.

(10) Patent No.: US 11,583,372 B2
(45) Date of Patent: Feb. 21, 2023

(54) METHOD FOR PRODUCING A DENTAL RESTORATION PART, AND A DENTAL PROCESSING MACHINE

(71) Applicant: Ivoclar Vivadent AG, Schaan (LI)

(72) Inventors: Martin Huber, Pfarrwerfen (AT); Alfons Wörmer, Bischofshofen (AT)

(73) Assignee: Ivoclar Vivadent AG, Schaan (LI)

( * ) Notice: Subject to any disclaimer, the term of this patent is extended or adjusted under 35 U.S.C. 154(b) by 27 days.

(21) Appl. No.: 16/467,577

(22) PCT Filed: Nov. 21, 2017

(86) PCT No.: PCT/EP2017/079922
§ 371 (c)(1),
(2) Date: Jun. 7, 2019

(87) PCT Pub. No.: WO2018/108465
PCT Pub. Date: Jun. 21, 2018

(65) Prior Publication Data
US 2021/0205058 A1    Jul. 8, 2021

(30) Foreign Application Priority Data

Dec. 12, 2016    (EP) .................................... 16203488

(51) Int. Cl.
*A61C 13/00*    (2006.01)
*B23C 3/04*    (2006.01)

(52) U.S. Cl.
CPC ............ *A61C 13/0006* (2013.01); *B23C 3/04* (2013.01)

(58) Field of Classification Search
CPC ........ A61C 13/08; A61C 13/0006; B23C 3/04
See application file for complete search history.

(56) References Cited

U.S. PATENT DOCUMENTS

| 2005/0159840 | A1* | 7/2005 | Lin ..................... G05B 19/4163 700/245 |
| 2005/0246052 | A1 | 11/2005 | Coleman et al. |
| 2008/0090208 | A1* | 4/2008 | Rubbert ............. A61C 13/0004 433/173 |
| 2012/0148985 | A1 | 6/2012 | Jung et al. |

FOREIGN PATENT DOCUMENTS

| DE | 102005001600 A1 * | 6/2006 | ......... A61C 13/0009 |
| DE | 102005001600 A1 | 6/2006 | |
| DE | 102008027941 B4 * | 9/2010 | ............... B23C 3/06 |

(Continued)

OTHER PUBLICATIONS

Machine Translation of DE-102005001600-A1 (Year: 2006).*

*Primary Examiner* — Jacob J Cigna
(74) *Attorney, Agent, or Firm* — Ann M. Knab; Thad McMurray

(57) ABSTRACT

The invention relates to a process for producing a dental restoration part using a machine tool (10), especially a dental processing machine intended for a dentist's office, wherein, in a first step, a rotating processing tool (16) rotationally mills or processes or grinds a workpiece (18) while, except from at least one entry and/or exit path, it is in continuous contact with the workpiece (18), i.e. with 0% air battle, by machining the outer profile (19) of the workpiece (18) substantially completely in helical-shape. The invention also relates to a dental processing machine.

17 Claims, 3 Drawing Sheets

(56) References Cited

FOREIGN PATENT DOCUMENTS

| | | | |
|---|---|---|---|
| DE | 102010061116 A1 * | 6/2012 | ........... A61B 1/3132 |
| DE | 102012106849 A1 | 5/2014 | |
| DE | 102015010322 A1 * | 3/2016 | ............... B23C 3/00 |
| JP | 06-046842 U | 6/1994 | |
| JP | 2015-060480 A | 3/2015 | |

* cited by examiner

METHOD FOR PRODUCING A DENTAL RESTORATION PART, AND A DENTAL PROCESSING MACHINE

CROSS-REFERENCE TO RELATED APPLICATIONS

This application is a National Stage application of International patent application No. PCT/EP2017/079922 filed on Nov. 21, 2017, which claims priority to European patent application No. 16203488.8 filed on Dec. 12, 2016, all the disclosures of which are incorporated herein by reference in their entirety.

FIELD OF THE INVENTION

The invention relates to a process for producing a dental restoration part. The invention also relates to a dental processing machine.

BACKGROUND OF THE INVENTION

Conventional dental processing machines process workpieces essentially according to a method in which the workpiece is processed or milled in accordance with predetermined parameters, wherein a processing tool of the dental processing machine is moved along a predetermined processing path to produce a desired contour or surface. The processing tool is conventionally moved relative to the workpiece such that the tool is immersed into the workpiece and, after moving along the specified machining path, is withdrawn from the workpiece to start a new machining path. For completion of the dental restoration part, the processing tool thus performs a large number of stops and start on the workpiece to be machined, to re-position the processing tool relative to the workpiece and travel a new machining path.

DE 10 2008 027 941 B4 discloses a method for rotary milling of round sections of workpieces, wherein a rotary milling tool having at least one end cutting edge is rotatably driven around a tool rotational axis which has an eccentricity with respect to a workpiece rotational axis, and the rotary milling tool is brought into engagement with the workpiece by delivering towards the tool rotational axis while continuously reducing the eccentricity.

DE 10 2010 061 116 A1 discloses a method for the material-removing machining of an especially flat blank for the production of dental workpieces, such as inlays, crowns, bridges, webs, implant superstructures or the like, wherein a rotating tool is used alternately for machining a crown inner side of the workpiece in the intrados position of the blank, and a crown outer side in the extrados position of the blank. In order to use the side surfaces of the tool insert for essential material removal, the workpiece is additionally machined in a position of the blank that bisects the angle between the intrados position and the extrados position in a metados position.

DE 10 2015 010 322 A1 discloses a method for milling a workpiece, wherein the workpiece is milled by means of a cutter at least in a concave partial region by moving the cutter along a milling path relative to the workpiece, wherein the milling path has a trochoid-like course at least in a region where the cutter is moved while milling the concave partial region.

SUMMARY OF THE INVENTION

Thus, the object of the invention is to provide an improved method for producing a dental restoration part which provides a more efficient machining path of the workpiece by means of the processing tool, thereby shortening a machining time and increasing a machining quality. Moreover, increased efficiency of the machining path for the processing tool has the advantage that workpiece wear is reduced and risk of chipping off the workpiece during machining is reduced.

The object will be solved by a process to provide a dental restoration part having the features of the claims. Furthermore, the object will be solved by the use of a dental processing machine having the features of the claims.

The present invention provides a process for producing a dental restoration part using a machine tool, especially a dental processing machine intended for a dentist's office, which has a multi-axis workpiece arm and at least one tool spindle, in which, in a first step, a rotating processing tool mills or processes or grinds a workpiece, while, except at least one entry and/or exit path, it is in almost continuous contact with the workpiece, i.e. with 0 percent air contact or only a few percent, especially less than 10 percent air contact, by essentially machining the outer profile of the workpiece in a completely helical shape. According to the invention, elaborate three-dimensional structures may also be milled. When viewed along the helical axis, there is still a helical processing course, wherein it is understood that when viewed in the other two directions, the shape may considerably deviate from a circular shape.

According to the invention, during machining, i.e. following the first contact and prior to the last contact of the machining insert with the workpiece, continuous contact among them is particularly preferred. This means that essentially the same machining forces are always applied. The machining train is kept under tension so that any drive play will not be effective. The machining accuracy increases considerably. In some cases, the contact can also be briefly interrupted, especially with elaborated structures requiring this. However, the number of interruptions is small, especially less than ten, wherein only one is required and none is preferred. The same applies to the interruption time and/or the interruption path. According to the invention, both should preferably be less than 10%, especially preferably less than 1%.

The invention also provides a process for producing a dental restoration part using a machine tool, in particular a dental processing machine intended for a dentist's office, comprising a multi-axis workpiece arm and at least one tool spindle, wherein, in a first step, a rotating processing tool turn-mills the workpiece or processes or grinds the workpiece, during which time the workpiece is converted into a convex intermediate product, i.e. devoid of concavity, and, in a second step, which is also performed by turn-milling or rotating, a cavity of the workpiece is completed by increasingly immersing said cavity, thus producing a concave shape of the workpiece.

The invention also provides a dental processing machine, in particular a dentist's office dental processing machine, comprising a multi-axis workpiece arm and a motor-driven tool spindle, and a control device for the machining of the workpiece strategy of the dental processing machine, wherein the control device, especially except entry and exit path, controls the movement of the multi-axis workpiece arm while maintaining a substantially continuous contact between the processing tool and the workpiece, i.e. with 0 percent air contact, by machining the outer profile of the workpiece in a substantially helical manner.

One aspect of the present invention is to provide a strategy for the machining paths of the processing tool of the machine tool at the workpiece, by means of which all possible geometries can be realized. What is essential herein, is the implementation of the inventive feature that the processing tool is in constant contact with the workpiece, i.e. completion of the geometry to be set up is done along a single machining path without withdrawal from the workpiece.

Such a machining strategy advantageously provides the best possible cutting conditions for the machining insert, as, in this way, unevenness caused in conventional machining strategies due to withdrawal from and approaching to the workpiece can be avoided. Chippings during workpiece machining when processing fragile materials, such as glass ceramics or the like, can also be reduced. This can advantageously be achieved by the helical-shaped, i.e. devoid of corners, machining path of the processing tool on the workpiece.

Advantageous embodiments and further developments will arise from the subclaims as well as from the description while making reference to the figures.

According to a preferred embodiment, it is provided for a cavity of the workpiece to be machined in a second step. Therefore, the aforementioned machining strategy of helical machining the piece using the processing tool can also be used to form a cavity in the tool.

According to another preferred embodiment, machining is carried out at a constant feed rate. In this way, constant material removal of the workpiece can advantageously occur thus assuring formation of a precise surface geometry.

According to another preferred embodiment, it is provided for each machining step to involve at most one close approach between the workpiece and the processing tool and at most one withdrawal of the workpiece and the processing tool and, in particular, at most two machining steps for the production of the dental restoration part by means of the dental machine. The provision of a maximum of two machining steps thus provides an advantageous and efficient method of manufacturing the dental restoration part, in which both the external geometry and the cavity of the workpiece can efficiently and precisely be produced.

According to another preferred embodiment, it is provided, during the first step and the second step, for a constant pressure between workpiece and processing tool to be maintained and directional changes of the machining to be avoided as far as possible. Due to mounting the workpiece on the multi-axis workpiece arm, the workpiece can be displaced and/or rotated in relation to the processing tool, such that that constant pressure will be maintained between the workpiece and the processing tool when passing the specified machining path. Similarly, due to the mobility of the workpiece in relation to the processing tool, directional changes during machining, i.e. directional changes of the processing tool can be avoided.

According to another preferred embodiment, it is provided, in case of a corner of the dental restoration part to be created by the workpiece arm, for the workpiece to be rotated such that the direction of the force applied by the workpiece to the processing tool is changed as little as possible, and in particular is maintained, while maintaining deflection of the processing tool by the applied machining force. Thus, a highly precise geometry of the dental restoration part can advantageously be produced.

According to another preferred embodiment, it is provided, in an additional third step, for milling to take place at a preparation boundary at the occlusal surface and/or at a connection of the workpiece. Thus, polishing or finishing of the workpiece can advantageously be carried out.

According to another preferred embodiment, it is provided for a processing step to be basically carried out as helical processing, especially also on a gingival cavity of the workpiece. Thus, uniform material removal or uniform surface quality of the dental restoration part can also be provided in the area of the gingival cavity of the workpiece.

According to another preferred embodiment, it is provided, in the case of inlays, onlays and/or veneers as dental restoration parts, for the edge to be milled as a helical shape such that the machining direction always faces towards the edge. This advantageously allows the edge of the workpiece to have a smooth or rounded contour.

According to another preferred embodiment, it is provided, during machining, for the workpiece to pass a helical path in relation to the processing tool, and an essentially constant removal volume per time unit will be generated in the first step, and especially a constant force is provided between the workpiece and the processing tool. In this way, a precise surface geometry of the dental restoration part to be created can advantageously be produced in an efficient manner, thus advantageously reducing machining time.

According to another preferred embodiment, the control device is configured to machine a possible gingival cavity of the workpiece.

Thus, uniform material removal or surface finish of the dental restoration part can also be provided in the area of the gingival cavity of the workpiece.

According to another preferred embodiment, it is provided for the dental processing machine to be designed as a 5/0-axis milling machine, i.e. including five axes for the multi-axis workpiece arm and zero axes for the processing tool, and four axes especially will be used during the first step and five axes during a second step. In this way, the workpiece can move along any given machining path in relation to the rotating processing tool, which means that all possible surface geometries of the dental restoration part are feasible. In addition, machining precision, especially in rotational milling, with this axis distribution is excellent. Due to uniform load on the workpiece arm, the typically existing axis joint clearance has no effect at all. Each bearing abuts on one side, i.e. is at "end stop". Machining accuracy can be as low as 10 micrometers.

According to another preferred further training, it is planned that a feed of the dental processing machine is adapted in such a way that constant cutting conditions are present and, in particular, the speed of the dental processing machine can be adjusted in a range between 2,000 rpm and 50,000 rpm. By providing constant cutting conditions, a uniform surface removal can be realized in an advantageous way. To enable this, the combination of providing constant cutting conditions and the adaptability of the speed of the processing machine serves to achieve uniform material removal for a precise removal result.

The configurations and further embodiments described may be combined with each other, as desired.

Further possible configurations, embodiments and implementations of the invention also include combinations of features of the invention, which are not explicitly mentioned and which have previously been described or will be described in the following while making reference to the working examples

BRIEF DESCRIPTION OF THE DRAWINGS

The associated drawings are intended provide further understanding of the embodiments of the invention. They illustrate embodiments and are to explain the principles and concepts of the invention in connection with the description.

Other embodiments and many advantages mentioned above will arise while making reference to the drawings. The elements depicted in the drawings are not necessarily to scale in relation to each other, wherein.

Figure 1:
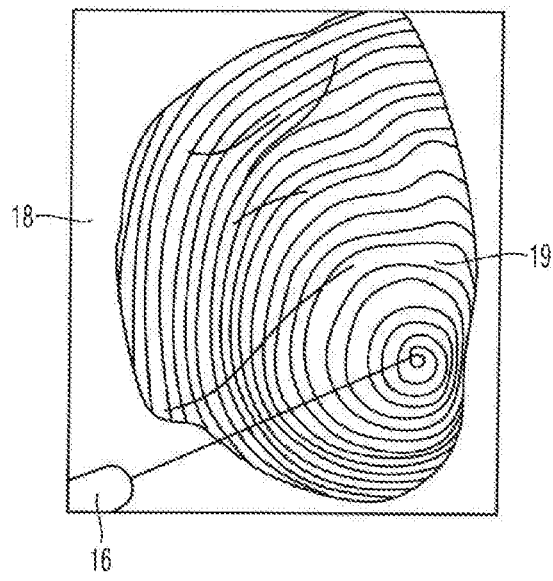
FIG. 1 is a schematic representation of material removal from a workpiece in accordance with a preferred embodiment of the invention.

In the figures in the drawings, equal reference numbers will designate equal or functionally equal elements, parts or components, unless it is indicated otherwise.

FIG. 1 shows a schematic representation of material removal from a workpiece according to a preferred embodiment of the invention.

DETAILED DESCRIPTION

The process for creating a dental restoration part using a machine tool (not shown in FIG. 1. Comprises, in a first step, that a rotating processing tool 16 turn a workpiece 18. Alternatively, the rotating machining insert 16 can for example mill or grind the workpiece 18. Except at least one entry and/or exit path, the processing tool 16 is in continuous contact with the workpiece 18.

The processing tool 16 thus exhibits 0% air contact while machining the outer profile 19 of the workpiece 18 in an essentially complete helical shape.

The workpiece 18 is preferably machined at a constant feed rate. Alternatively, the feed rate of the processing tool can be adjusted depending on the machining geometry or the material to be machined. The feed rate of the processing tool may vary depending on the rotational speed of the processing tool.

For each machining step, there is at most one approach between the workpiece 18 and the processing tool 16 and at most one withdrawal of the workpiece 18 and the processing tool 16. Furthermore, the procedure has at most two machining steps for the generation of the dental restoration part using the dental processing machine. This is the preferred way to achieve high machining efficiency and machining quality.

During the first step and the second step, constant pressure between the workpiece and the processing tool is preferably provided. Changes of the machining direction are avoided as far as possible. In the case of a corner of the dental restoration part to be created by the workpiece arm (not shown in FIG.), the workpiece is preferably rotated such that the direction of the force applied by the workpiece to the processing tool is changed as little as possible. Especially, the direction of the force applied by the workpiece 18 to processing tool 16 is maintained, while maintaining a deflection of the processing tool 16 by the applied machining force.

During machining, the workpiece 18 passes a helical path in relation of the processing tool 16. Essentially, a constant removal volume per time unit is generated in the first step. In addition, a constant force is provided between the workpiece 18 and the processing tool 16. The dental processing machine (not shown in FIG. 1) preferably is configured as a 5/0 axis milling machine. Thus, the multi-axis workpiece arm has five axes and the processing tool 16 zero axes. During the first step, four axes are preferably used and during the second step five axes are preferably used.

Figure 2:
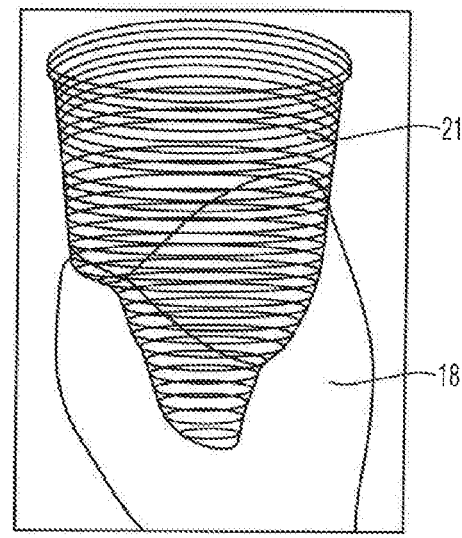
FIG. 2 is a schematic representation of material removal from a workpiece according to another preferred embodiment of the invention.

FIG. 2 shows a schematic representation of material removal from a workpiece according to another preferred embodiment of the invention.

The process for creating the dental restoration part, in a first step, comprises a rotating processing tool (not shown in FIG. 2) turning the workpiece 18. Alternatively, the workpiece 18 can for example be turn-milled or ground.

In this machining process, the workpiece 18 is turned into a convex intermediate product, i.e. devoid of concavity, and in a second step, a cavity 21 of the workpiece 18 is finished by increasingly immersing into the cavity by rotational processing or alternatively by rotational milling, while producing a concave shape. Basically, machining is helically performed. Furthermore, a constant removal volume per time unit and especially, a constant force between workpiece 18 and the processing tool is provided.

In the milling process shown in FIG. 2 for an inlay as a dental restoration part, the edge 24 is helically milled such that the machining direction always faces the edge 24. The same applies to dental restorations such as onlays and/or veneers.

Figure 3:
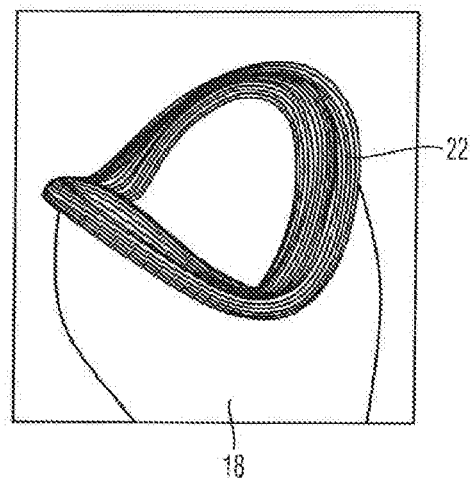
FIG. 3 is a schematic representation of material removal from a workpiece according to the preferred embodiment of the invention.

FIG. 3 shows a schematic representation of material removal from a workpiece according to the preferred embodiment of the invention. In an additional third step milling is performed at a preparation boundary 22 of the workpiece 18. In addition or alternatively, milling can be carried out on an occlusion surface and/or on a connection of the workpiece 18, for example.

Figure 4:
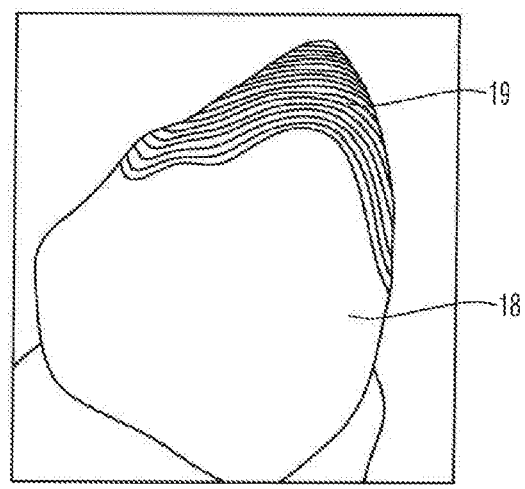
FIG. 4 is a schematic representation of material removal from a workpiece in accordance with the preferred embodiment of the invention.

FIG. 4 shows a schematic representation of material removal from a workpiece according to the preferred embodiment of the invention. Final machining of the occlusal surface of the workpiece 18 shown in FIG. 4 is also carried out by passing the workpiece along a helical machining path in relation to the processing tool.

Figure 5:
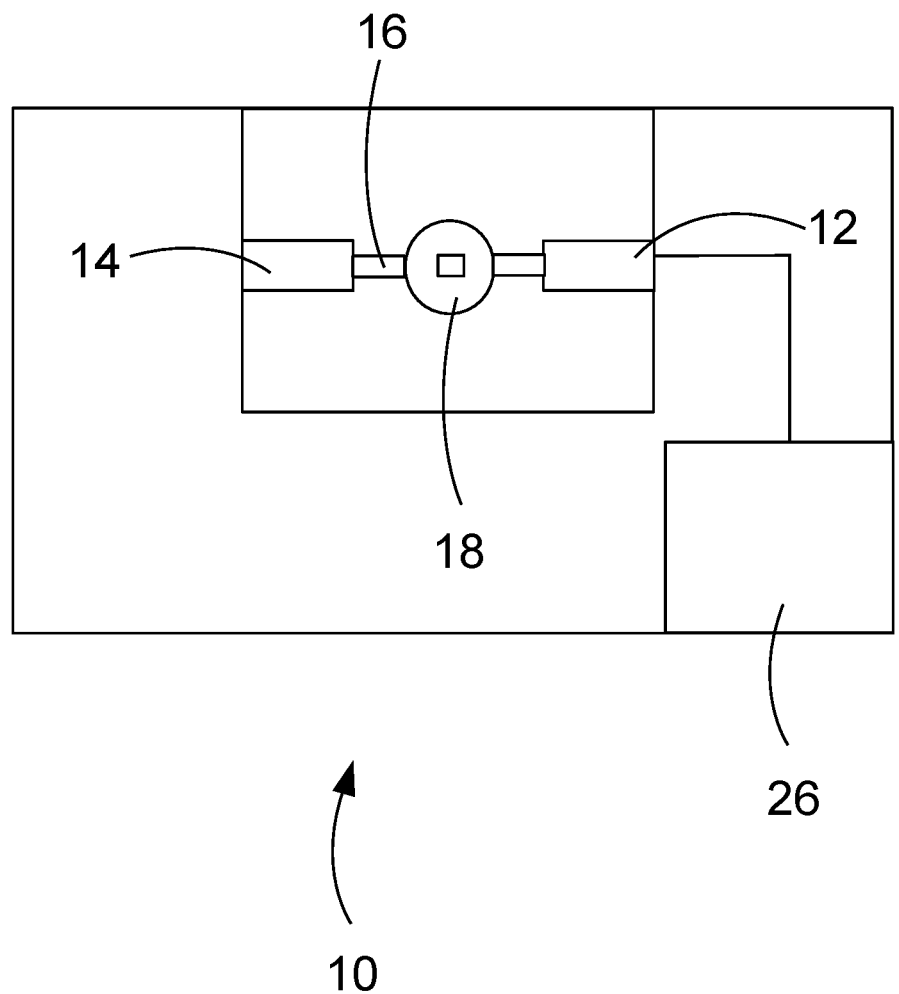
FIG. 5 is a schematic representation of a dental processing machine according to the preferred embodiment of the invention.

FIG. 5 shows a schematic representation of a dental processing machine according to the preferred embodiment of the invention. The dental processing machine or the machine tool 10 comprises a multi-axis workpiece arm 12 and a motor-driven tool spindle 14. In addition, the dental machine comprises a control device 26 for the machining strategy of the machine tool.

The control device 26 is configured to control an entry and exit path, a movement of the multi-axis workpiece arm 12 while maintaining continuous contact or movement between processing tool 16 and workpiece 18, i.e. with 0% air contact. This is achieved by turning an outer profile of the workpiece 18 essentially in a helical-shaped manner. The control device 26 is also configured to machine a possible gingival cavity of the workpiece 18.

The dental machine is preferably designed as a 5/0-axis milling machine. Accordingly, the multi-axis workpiece arm comprises five axes and the processing tool 16 zero axes. In the first step, four axes are especially used and five axes are used in the second step. A feed of the dental processing machine is preferably adjustable such that constant cutting conditions exist and especially a speed of the dental processing machine 16 is adaptable in a range between 2,000 rpm and 50,000 rpm.

Although the present invention has been described above by way of preferred examples, it is not limited thereto, but can be modified in many ways. In particular, the invention can be modified in many ways or modified without departing from the core of the invention.

For example, a machining strategy or a given machining path can be adapted to a geometry of the workpiece such that dimensioning the machining path, especially the helical-shaped machining path, can be adapted to the geometry of the workpiece to be generated. In particular, the helical-shaped machining path can dimensionally be varied so that any geometry of the workpiece or of the dental restoration part to be produced can be realized.

The invention claimed is:

1. A method for producing a dental restoration part using a machine tool (10) comprising a multi-axis workpiece arm (12) and at least one tool spindle (14), said method comprising in a first step, a rotating processing tool (16), rotatably processes or grinds workpiece (18), while, except for at least one entry and/or exit path, substantially is in continuous contact with the workpiece (18), by machining an outer profile (19) of the workpiece (18), wherein the dental processing machine is formed as a 5/0 axial machine with the workpiece arm configured to move on 5 axes, wherein the rotating processing tool (16) is fixed in position, and wherein the workpiece (18) is machined by turn-milling.

2. The method according to claim 1, wherein, in a second step, a cavity (21) of the workpiece (18) is machined.

3. The method according to claim 1, wherein the machining is carried out at a constant feed rate and/or with a constant force.

4. The method according to claim 1, wherein per machining step at most one approach occurs between the workpiece (18) and the processing tool (16) and at most one removal of the workpiece (18) and the processing tool (16) occurs.

5. The method according to claim 1, wherein during the first step and the second step a constant pressure is maintained between the workpiece (18) and the processing tool (16), and wherein directional changes of the machining are avoided.

6. The method according to claim 1, wherein, at a corner of the dental restoration part to be produced, the workpiece (18) is rotated by the workpiece arm (12), such that the direction of the force exerted by the workpiece (18) on the processing tool (16) is maintained.

7. The method according to claim 1, wherein, in an additional third step, milling is performed at a preparation boundary (22), at the occlusion surface and/or at a connection of the workpiece (18).

8. The method according to claim 1, wherein, in a machining step, machining is carried out to result in a helical shape of the workpiece (18).

9. The method according to claim 1, wherein, with inlays, onlays and/or veneers as dental restoration parts, the edge (24) is milled in a helical shape such that the machining direction always faces towards the edge (24).

10. The method according to claim 1, wherein the machine tool is a dental processing machine intended for a dentist's office, and wherein less than 10 interruptions of the contact between the processing tool and the workpiece occur during a machining operation and/or less than 10% of the movements of the processing tool relative to the workpiece occur without any contact between the processing tool and the workpiece.

11. The method according to claim 1, wherein machining the outer profile (19) comprises machining in a helical shape.

12. The method according to claim 1, wherein at most two machining steps are provided for the production of the dental restoration part by means of the dental machining machine.

13. The method according to claim 1, wherein, at a corner of the dental restoration part to be produced, the workpiece (18) is rotated by the workpiece arm (12), such that the direction of the force exerted by the workpiece (18) on the processing tool (16) is maintained while maintaining a deflection of the processing tool (16) by way of the exerted machining force.

14. The method according to claim 1, wherein, in a machining step, machining is carried out to result in helical shape on a gingival cavity (21) of the workpiece (18).

15. The method according to claim 1, wherein, in the first step, the outer profile of the workpiece (18) is produced to form a convex intermediate product, and in a second step, likewise by rotary milling or processing, a cavity (21) of the workpiece (18) is completed by machining the workpiece (18) by increasingly immersing thereinto, thereby producing a concave shape.

16. The method according to claim 15, wherein during machining, the workpiece (18) passes through a helical-shaped path relative to the processing tool (16), and a substantially constant removal volume per time unit is generated in the first step, and a constant force is provided between the workpiece (18) and the processing tool (16).

17. The method according to claim 15, wherein the machine tool (10) comprises a dental processing machine intended for a dentist's office, and wherein the convex intermediate product comprises a product devoid of concavity.

* * * * *